3,164,543
COPPER SWEETENING
Marcus Bernard Shirley, Bournemouth, and David Tonge, Brokenhurst, England, assignors to Esso Research and Engineering Company, a corporation of Delaware
Filed Feb. 7, 1963, Ser. No. 256,917
Claims priority, application Great Britain Feb. 14, 1962
5 Claims. (Cl. 208—193)

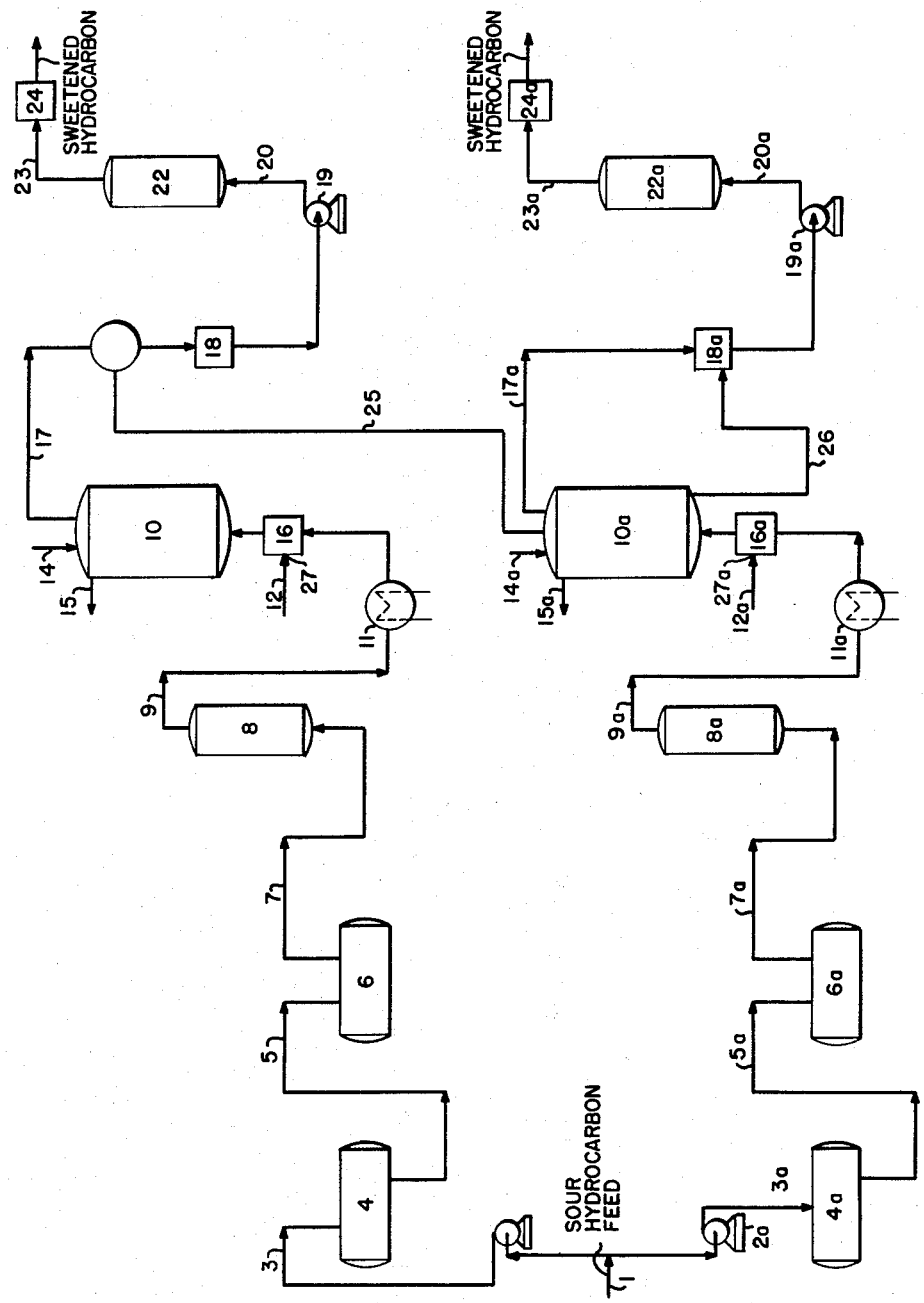

This invention relates to improvements in copper sweetening and is directed to the prolongation of the useful life of the copper sweetening catalyst.

The process of copper sweetening hydrocarbon distillates is well established in practice and fully described in the literature. To the refiner the expression "sweetening" refers to the conversion of mercaptan sulphur compounds, contained in the hydrocarbon distillates, to disulphides by an oxidation type reaction. Among the objects of sweetening are to remove the objectionable odour of mercaptans and to reduce the corrosion characteristics of the hydrocarbon distillates. In the copper sweetening process the oxidation reaction is generally performed in the presence of a catalyst consisting of cupric chloride absorbed on particles of a clay.

In the operation of a conventional copper sweetening process mercaptan containing hydrocarbon feed, referred to as sour hydrocarbon feed, passes through a feed pump under flow control and through a sand coalescer and settling drum to remove entrained water. The feed then passes through a drier, for example a calcium chloride column, and a feed preheater. The use of a drier reduces the amount of preheating required. Sufficient air or oxygen is added to the hydrocarbon stream to ensure that an adequate supply of air for the sweetening reaction is maintained and provision is made to cut off the air supply should the hydrocarbon stream cease to flow. The feed passes through an orifice mixer and thence into the reactor containing the sweetening catalyst.

During the course of the copper sweetening reaction cupric chloride is reduced to cuprous chloride and free hydrochloric acid is also formed. Cuprous chloride formed in the reaction, although only slightly soluble in water, is soluble in solutions containing a high concentration of chlorides and this behaviour facilitates the reconversion of the cuprous salt to the cupric salt in the presence of air. In use the activity of the catalyst diminishes until a point is reached where it must be replaced. It has been found that the removal of even small quantities of copper can reduce the useful life of a catalyst bed; it has been further discovered that a significant cause of catalyst inactivation is the considerable loss of water from the bed of the catalyst. In the classic copper sweetening reaction the first stage is the formation of cuprous mercaptide, disulphide and hydrochloric acid. This phase of the reaction is rapid but the succeeding phase, the conversion of mercaptide to disulphide, proceeds more slowly. Cuprous mercaptide is oil soluble, thus it will be seen that there will be a tendency for it to move up the catalyst bed during the reaction so that, even in ideal conditions, there will be a tendency for copper to be lost from the bottom of the catalyst. As however, in the conventional process, the bed is also being continuously dehydrated the loss of water up the bed will accelerate the rate of loss of hydrochloric acid. The loss of hydrochloric acid and water lowers the solubility of cuprous chloride thus preventing its complete regeneration and hence moving the effective position of reaction up the reactor. In time the point of reaction reaches the top of the reactor and the catalyst then becomes inactive.

When the reaction zone reaches the top of the reactor the product becomes off grade because sweetening is no longer completed, and the product is doctor positive, and also because the soluble copper mercaptides that are formed as an intermediate stage in the sweetening reactions are carried out of the bed before they can be deposited by the regeneration reactions and the product has a high copper content.

Dehydration has been found to be most pronounced at the ingress to (normally the bottom of), the catalyst bed because both reaction air or oxygen and fuel usually enter the reactor at the bottom and both are unsaturated with water. As the mixture flows up through the bed, water is generated by the sweetening reactions and dissolves in the hydrocarbon but some of it evaporated into the air.

In the present invention the process of dehydration is minimized and copper migration reduced by passing a sweetened hydrocarbon stream in reverse flow, e.g., from top to bottom, through a bed of a partly dehydrated catalyst. Thus, instead of all the water which is in suspension or solution in the outgoing stream of sweetened hydrocarbon, being removed by the conventional drying unit downstream of the reactor, some of it is reabsorbed in the bed of the partly dehydrated catalyst. The process is applicable where, as is conventional, two or more reactors are available and the reactors may be cyclically regenerated by passing hydrocarbon feed in normal flow through one reactor and then in reverse flow through a second partially dehydrated reactor. The method of operation consists in discontinuing the feed of unsweetened hydrocarbon and reaction air, or oxygen, to a reactor, whilst its catalyst is being reactivated, and flowing sweetened hydrocarbons from an active reactor in reverse flow through the dehydrated reactor, the sweetened hydrocarbon passing therefrom being subjected to the usual steps which follow its passage through the sweetening reactor. Uniform rehydration of the partly dehydrated reactor will result from the reabsorption of water according to the different water hydrocarbon equilibrium conditions existing in the active catalyst bed and the idle catalyst bed. By this method rehydration of the more severely dehydrated bottom of the reactor can be achieved. Attempts to rehydrate the bottom of the reactor bed by other methods, such as by injecting water or steam into the bottom of the bed, have led to over hydration and breakdown of the clay particles into an unsatisfactory over-hydrated pasty mass.

The method of the invention also reduces the tendency for copper to migrate out of the system along with the recovered sweetened hydrocarbon since copper, entrained from the active reactor, will tend to deposit in the partly dehydrated reactor.

It is not practicable to reverse the flow of sweetened hydrocarbon through the active reactor since the first reactor in the system must be fed co-currently with air or oxygen in excess of the theoretical reaction requirement to reoxidize the catalyst to the cupric form. This air or oxygen must be freely removed from the hydrocarbon for reasons of safety. Counter-current flow of air and the hydrocarbon is not practicable since this would result in lifting the catalyst bed and other undesirable effects.

In experiments carried out, using the method of the invention, an increase in catalyst life of up to 35% has been obtained.

In the accompanying drawing the figure is a flow sheet showing the hydrocarbon flow through a copper sweetening system using a fixed bed catalyst, and showing additional connections permitting the flow of feed stock to designated reactors to be reversed.

By the employment of additional connections for reverse flow, the two reactors shown in the drawing can be operated in series. The order of flow is periodically reversed and the duration of flow through the reaction second in line is based upon the water content of the ingoing and outgoing streams. Thus in the initial operation of the reactor second in line, the outgoing water content is lower than the ingoing and flow is continued until water contents indicate that the second reactor is becoming saturated.

The accompanying drawing is a flow diagram of a copper sweetening process illustrating the invention. As shown in the drawing sour hydrocarbon feed passes, in normal operation, through line 1, via feed pumps 2 and 2a and lines 3 and 3a, to sand coalescers 4 and 4a and thence via lines 5 and 5a to settling drums 6 and 6a where entrained water is removed; feed then passes, via lines 7 and 7a, to drying columns 8 and 8a. Dried feed passes, via lines 9 and 9a, through pre-heating devices 11 and 11a and orifice mixers 16 and 16a, to the bottom of reactors 10 and 10a, reaction air being introduced to the orifice mixer via lines 12 and 12a at 27 and 27a. Feed passes up through reactors 10 and 10a, and passes through lines 17 and 17a through strainers 18 and 18a, pumps 19 and 19a, lines 20 and 20a to drying columns 22 and 22a. Dried product is then passed via lines 23 and 23a through filters 24 and 24a. Inert gas is introduced to the reactors through lines 14 and 14a, and gaseous reactor products are vented through lines 15 and 15a. By the inclusion of suitable additional feed lines, such as 25 and 26, and appropriate valves, feed may be channelled in reverse flow from reactor 10 to reactor 10a. It will be clear that, alternatively, feed may be channelled from reactor 10a in reverse flow through reactor 10, suitable feed lines and valves (not shown) being provided. For example, when reactor 10a is being reactivated, the flow of unsweetened hydrocarbon through line 9a, and reaction air through 12a, is interrupted and sweetened hydrocarbon from reactor 10, flowing into line 17, is by-passed via line 25 to the top of reactor 10a and flows from reactor 10a through line 26 to strainer 18a, thence passing through 19a, line 20a, drying column 22a, line 23a and filter 24a.

A series of tests were carried out, employing the reverse flow principle of the invention, in a system employing two reactors. Water balances in both reactors were made by sampling and analyzing the hydrocarbon streams before entry to, and egress from, the two reactors and also by sampling and analyzing hydrocarbon streams of between the two reactors. Measurements of the quantity of regeneration air and the copper number of the feed were also made. The results showed that water lost in the first reactor can be picked up in the second reactor. In a series of tests, where under conventional operations the water loss from a reactor had been of the order of 90 lbs./day, the operation of the reverse flow principle of the invention showed an average water pick-up in the second reactor of the order of 62 lbs./day.

Table I shows the water balance across each reactor.

Table I

FIRST REACTOR

| | H₂O in H/C | H₂O formed | H₂O lost in vent | H₂O from 1st reactor |
|---|---|---|---|---|
| Wt. percent | 0.005 | 0.005 | | 0.009 |
| Lbs./day | 150.0 | 150.0 | 30.0 | 270.0 |
| See | line 9 | drum 10 | line 14 | line 25 |

SECOND REACTOR

| | H₂O Adsorbed | H₂O from 2nd reactor |
|---|---|---|
| Wt. percent | 0.0025 | 0.0065 |
| Lbs./day | 75.0 | 195 |
| See | drum 10a | line 26 |

In the example shown in Table I the copper number of the feed stream was 14 and the throughput was 10,000 barrels per day. The regeneration air rate was 3000 standard cubic feet per day. Each reactor held about 40 tons of catalyst.

Table II is a summary showing the water balance of a series of reverse flow operations carried out over an extended period of time showing a continuous water gain in the second reactor. Variations in water gain are due to the fact that, throughout the period, conditions of operation and catalyst were varied to demonstrate that, notwithstanding such variations the second reactor always showed a water gain.

Table II

| Day | Water content of Naphtha feed to 2nd reactor, lbs./day | Water content of Naphtha product from 2nd reactor, lbs./day | 2nd Reactor Water gain, lbs./day |
|---|---|---|---|
| 1 | 193 | 173 | 20 |
| 2 | 298 | 140 | 158 |
| 3 | 160 | 142 | 18 |
| 76 | 207 | 122 | 85 |
| 77 | 128 | 102 | 26 |
| 78 | 111 | 97 | 1 |
| 79 | 250 | 214 | 36 |
| 93 | 80 | 66 | 14 |
| 98 | 210 | 70 | 140 |
| 99 | 146 | 88 | 58 |
| 103 | 176 | 140 | 36 |
| 104 | 247 | 176 | 71 |
| 105 | 250 | 178 | 72 |
| 112 | 211 | 88 | 123 |
| 113 | 158 | 106 | 52 |
| 114 | 177 | 106 | 71 |
| 115 | 211 | 171 | 40 |
| 116 | 203 | 127 | 76 |

The catalyst batch in one reactor reached a life 4.3 lbs. mercaptan S oxidized/lb. $CuCl_2 \cdot 2H_2O$ and a throughput of 990 MB sweetening turbo jet fuel compared with a previous highest life of 2.8 and throughput of 607 MB. It is therefore clear that a considerable improvement in catalyst life is possible by using the series flow operation of the present invention.

What is claimed is:

1. A process for sweetening a sour petroleum hydrocarbon by removal of sulfur impurities present therein as mercaptans utilizing a reaction zone containing a supported cupric chloride catalyst characterized by having a one end and an other end, said process comprising flowing a feed stream of a mixture including said sour hydrocarbon and an oxygen-containing gas from one end to the other end of said reaction zone, discharging a sweetened hydrocarbon stream as a primary effluent from said other end of said reaction zone, continuing flowing said feed stream for a time period less than that required to completely dehydrate said catalyst at said other end of said reaction zone, thereafter discontinuing said flow of said mixture, passing at least a portion of said sweetened hydrocarbon primary effluent in reverse flow from said other end to said one end of said reaction zone, discharging a sweetened hydrocarbon stream as a secondary effluent from said one end of said reaction zone and continuing said reverse flow from said other end to said one end for a time period sufficient to rehydrate said catalyst.

2. The process in accordance with claim 1 wherein the catalyst in said reaction zone is cyclically rehydrated by cyclically alternating said flow of said mixture from said one end to said other end with said flow of said sweetened hydrocarbon primary effluent from said other end to said one end.

3. The process in accordance with claim 1 wherein said reverse flow of said sweetened hydrocarbon primary effluent from said other end to said one end of said reaction zone is carried out in the absence of any added oxygen-containing gas.

4. A process for sweetening a sour petroleum hydrocarbon by removal of sulfur impurities present therein as mercaptans utilizing at least two reaction zones, each containing a supported cupric chloride catalyst, each reaction zone being characterized by having a one end and another end, said process comprising the steps of flowing a feed stream of a mixture including said sour hydrocarbon and an oxygen-containing gas from one end to the other end through each of said reaction zones, discharging a sweetened hydrocarbon stream as a primary effluent from said other end of each of said reaction zones, continuing flow of said feed mixture through said reaction zones for a time period sufficient to partially dehydrate said catalyst at said other end of at least one of said reaction zones, discontinuing said flow of said feed mixture to at least one of said partially dehydrated reaction zones, thereafter passing at least a portion of said sweetened hydrocarbon primary effluent from at least one of said reaction zones in reverse flow from said other end to said one end of at least one of said partially dehydrated reaction zones and continuing said reverse flow from said other end to said one end for a time period sufficient to substantially rehydrate said catalyst.

5. A process in accordance with claim 4 wherein the sweetened hydrocarbon primary effluent passed in reverse flow from said other end to said one end of a partially dehydrated reaction zone is the product stream from a reaction zone other than the reaction zone being rehydrated.

References Cited in the file of this patent

UNITED STATES PATENTS

| | | |
|---|---|---|
| 2,163,312 | Schulze | June 20, 1939 |
| 2,223,643 | Shoemaker | Dec. 3, 1940 |
| 2,768,885 | Kalimowski et al. | Oct. 30, 1956 |